Sept. 30, 1941.  A. R. SCHOENKY  2,257,132
MACHINE FOR OPERATING UPON WORK
Filed Nov. 30, 1939  8 Sheets-Sheet 5

INVENTOR
August R. Schoenky
By his Attorney
Victor Cobb

Sept. 30, 1941. A. R. SCHOENKY. 2,257,132
MACHINE FOR OPERATING UPON WORK
Filed Nov. 30, 1939 8 Sheets-Sheet 6

Fig. 14.

INVENTOR
August R. Schoenky
By his Attorney
Victor Cobb.

Fig. 15.

UNITED STATES PATENT OFFICE 2,257,132

MACHINE FOR OPERATING UPON WORK

August R. Schoenky, Swampscott, Mass., assignor to United Shoe Machinery Corporation, Borough of Flemington, N. J., a corporation of New Jersey Application November 30, 1939, Serial No. 306,807

55 Claims. (Cl. 164—93)

This invention relates to machines for operating upon work and is herein illustrated in its application to an insole punching machine of the type disclosed in Letters Patent of the United States No. 1,790,837, granted February 3, 1931, upon an application of A. F. Pym. It will be understood, however, that the invention in some aspects is not limited to machines of the particular type illustrated or to machines for punching insoles.

Machines of the above-mentioned type have been utilized to provide an insole with three positioning holes in predetermined relation to its edge contour to adapt the insole for use in practicing the method disclosed in United States Letters Patent No. 1,674,060, granted June 19, 1928, upon an application of A. F. Pym, the positioning holes in the insole being utilized with similar holes formed in a last to position the work in a shoe machine. It is highly important, for satisfactory results in carrying out the method above referred to, that the positioning holes be formed in the insole in a definitely predetermined relation to one another and to the edge contour of the insole, and for this purpose the machine shown in Letters Patent No. 1,790,837 is provided with three punches mounted in the desired spaced relation to one another and with gaging devices arranged to engage the edge face of the insole at the toe end and at opposite sides of the toe end to locate the insole in the desired predetermined relation to the punches. It will be evident that in the use of such a machine the production of accurate work depends largely upon the operator, since any failure of the operator to position the work in engagement with all of the gaging devices, or any accidental displacement of the work out of engagement with one or more of the gaging devices prior to the operation of the punches will result in faulty work and consequent loss of the insole to the manufacturer.

It is accordingly an object of the present invention to provide in a machine of the above-mentioned type means dependent upon the correct positioning of the work relatively to the operating tool or punches for automatically controlling the operation of the machine. For the purpose in view, in the construction herein shown, gaging devices corresponding to the above-mentioned devices are utilized to control the mechanism for operating upon the work. The control is preferably effected through pressure of the work against all of the gaging devices, the punching tools being operated to form the positioning holes in the insole only when the insole is presented by the operator in the position determined by all the devices. In the illustrated machine, power-driven means is provided for operating the punching tool, and the machine includes mechanism for starting the power-driven means in operation. The gaging devices comprise a plurality of gages arranged to engage the edge face of the insole respectively at the toe end and at the opposite sides of the toe end portion of the insole, and associated with each gage is a contact device arranged to be closed in response to pressure of the insole against the gage, the contact devices being arranged in series to control an energizing circuit for a solenoid, energization of which operates the above-mentioned starting mechanism. As herein shown, the gaging devices comprise a toe gage and two pairs of side gages arranged to engage the edge face of the insole at the opposite sides of the toe end and at different distances from the toe gage. Each gage is mounted for limited movement relatively to its associated contact device to close the latter in response to pressure of the insole against the gage, the contact devices for each pair of side gages being carried by arms connected to cause the side gages of each pair to move in unison after the closing of the contact devices by the introduction of an insole between them. Associated with the toe gage is a sixth contact device arranged to be closed in response to movement of the toe gage prior to the closing of the series device associated with the toe gage, the sixth device being bridged across the five series devices and so connected as to maintain the energizing circuit for the solenoid closed, thereby preventing repetition of the operation of the machine such as might otherwise occur if the solenoid were de-energized and again energized because of the opening and closing of one or more of the five series devices due to vibration in the machine produced by the punches.

In accordance with a further feature, the invention provides novel means for holding a work piece in the position determined by the gaging means for the operation of the means which acts thereon. This holding means in the construction shown comprises a pair of members constructed partially to pierce the insole and held normally in an inoperative position by spring means against the resistance of which they are moved toward the insole into position partly to pierce the insole through means operated by a second solenoid, the energizing circuit of which is also controlled by the above-mentioned five series devices. Preferably and as illustrated, the energizing circuit for this solenoid includes a mechanically operated switch which is normally held closed but which is arranged to be opened to cause deenergization of the solenoid and the release of the holding means to the action of the above-mentioned spring means substantially at the end of the punching operation. Conveniently and in accordance with still another feature of the invention, a testing circuit is provided containing an indicator and means enabling the operator at will to connect each of the above-mentioned contact devices and the testing circuit to determine whether each device is closed by movement of its associated gage in response to pressure of the work against the gage.

The above and other features of the invention, including various novel details of construction and combinations of parts, will now be more particularly described with reference to the accompanying drawings and thereafter pointed out in the claims.

Figure 2:
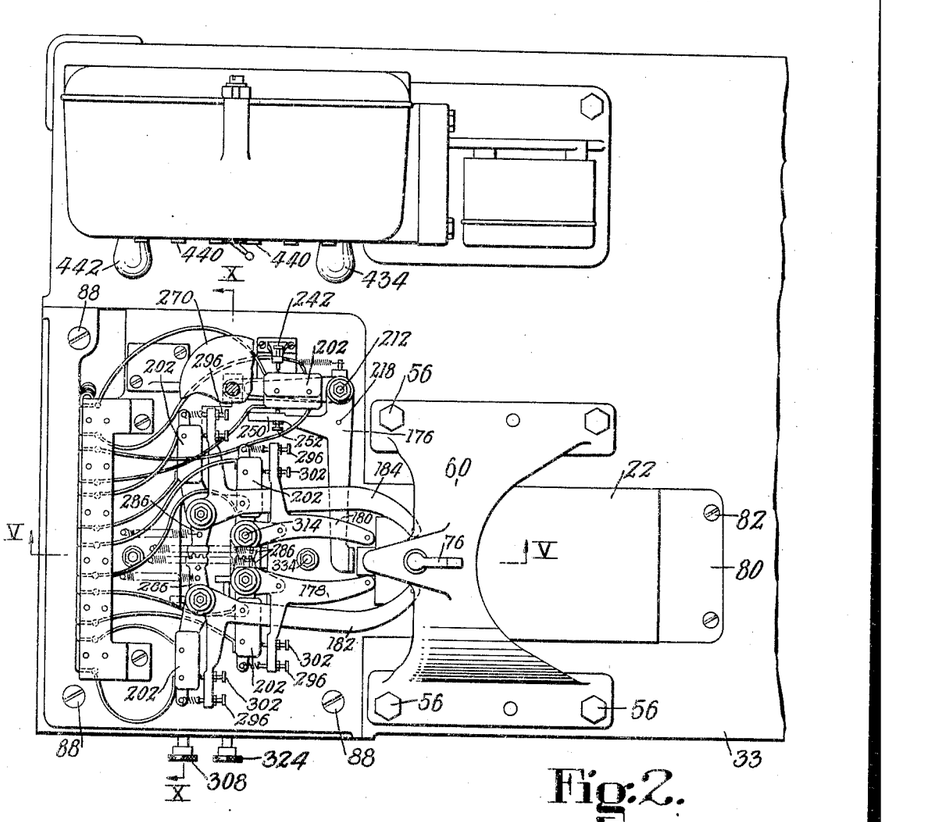
Fig. 2 is a plan view on an enlarged scale of a portion of the machine shown in Fig. 1, with the cover plate for the gaging devices removed to show more clearly the construction thereof.
Figures 5, 6, 7, 8, 9:
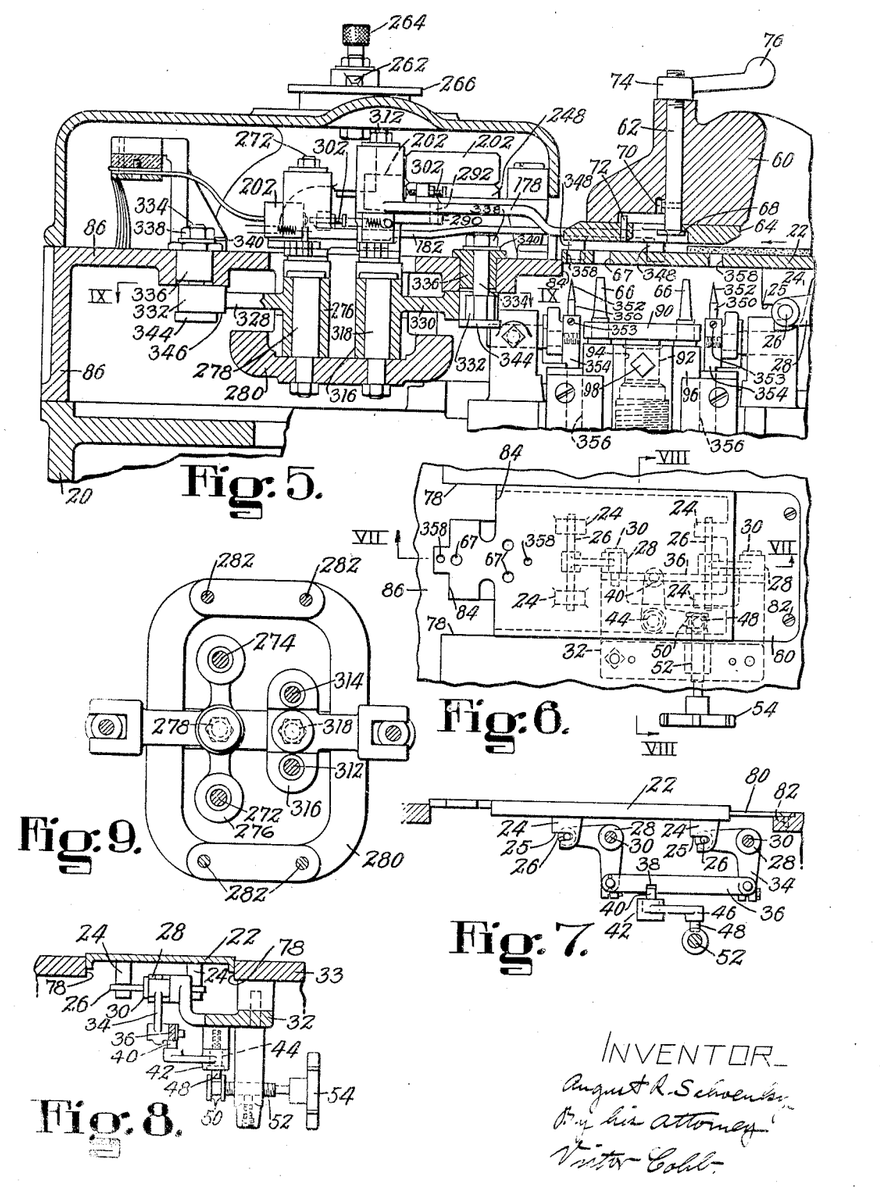
Fig. 5 is a section on the line V—V of Fig. 2.
Fig. 6 is a plan view of the sole support and its adjusting means.
Fig. 7 is a section on the line VII—VII of Fig. 6.
Fig. 8 is a section on the line VIII—VIII of Fig. 6.
Fig. 9 is a section on the line IX—IX of Fig. 5.

The illustrated machine comprises a frame 20 on which there is adjustably mounted a sole support comprising a flat horizontal plate 22 provided with downwardly extending lugs 24 in which are formed horizontal slots 25 which receive rods 26 carried by equal bell-crank levers 28 pivotally connected at 30 to a bracket 32 secured to the top plate 33 of the frame 20 (Figs. 6, 7 and 8). The bell-crank levers 28 have downwardly extending arms 34 connected by a link 36 in which is formed a slot 38 to receive an upwardly extending pin 40 carried by one arm of a bell-crank lever 42 pivotally connected at 44 to the bracket 32. The other arm 46 of the bell-crank lever 42 carries a downwardly extending pin 48 arranged to extend into an annular groove 50 formed in one end of an adjustable rod 52 threaded into the bracket 32 and having secured to its outer end a hand wheel 54 for turning it. It will be evident that by turning the hand wheel 54 endwise movement may be imparted to the rod 52 to swing the bell-crank lever 42 and, through the link 36, the bell-crank levers 28 in directions to raise or lower the sole support 22. Secured by screws 56 (Fig. 2) to the top plate 33 of the frame 20 is a yoke-shaped bracket 60 to which there is secured by a draw bolt 62 (Fig. 5) a flat horizontal plate 64 which serves as an anvil for a plurality of punches 66 which, as more particularly hereafter pointed out, are reciprocated through openings 67 in the sole support 22 at the proper time in the operation of the machine to form holes in the sole in predetermined relation to its edge contour. The anvil 64 is slotted to receive the head portion 68 of the draw bolt 62 which is held against turning movement in the bracket 60 by means of a slot and pin arrangement 70, a similar pin and slot arrangement 72 being provided for preventing relative lateral swinging movement of the anvil 64 and the bracket 60. Threaded on the upper end of the draw bolt 62 is a nut 74 provided with a handle 76 for turning it to impart endwise movement to the draw bolt to clamp or release the anvil. By rotation of the hand wheel 54 the position of the sole support 22 relatively to the anvil 64 may be varied to accommodate soles of different thicknesses. The sole support is fitted to slide in a slot 78 (Fig. 6) in the top plate 33 between a plate 80 secured to the top plate by screws 82 and the edge faces 84 of a bracket 86 secured to the top plate by screws 88 (Figs. 2 and 4). Accordingly as the position of the sole support relatively to the anvil is adjusted, as above described, its position lengthwise and laterally of the machine relatively to the punches 66 is not varied.

Figure 1:
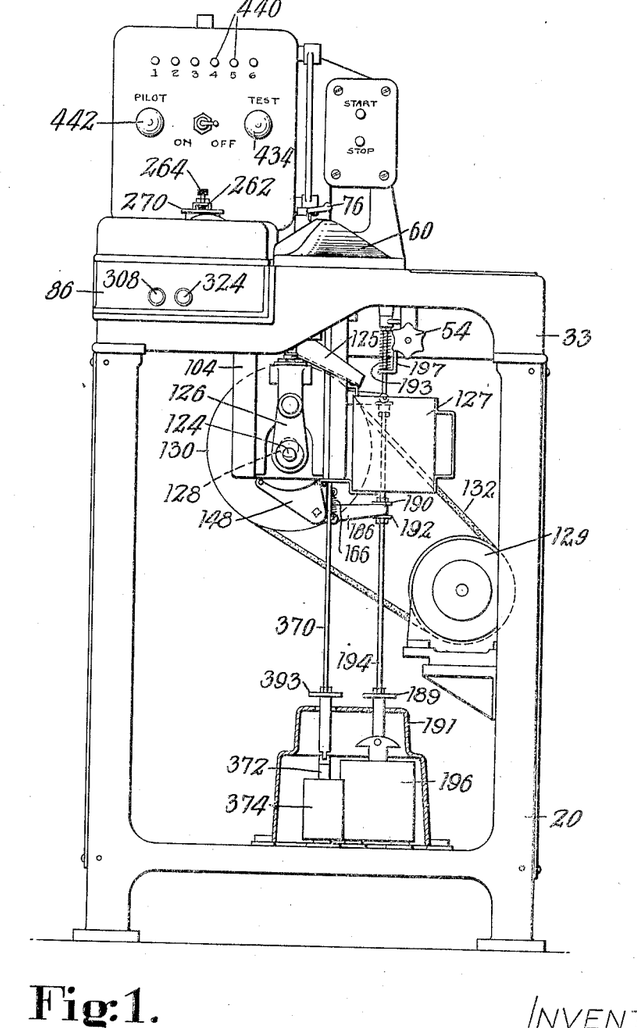
Fig. 1 is a view in front elevation of a machine in which the invention is embodied.
Figures 16, 18:
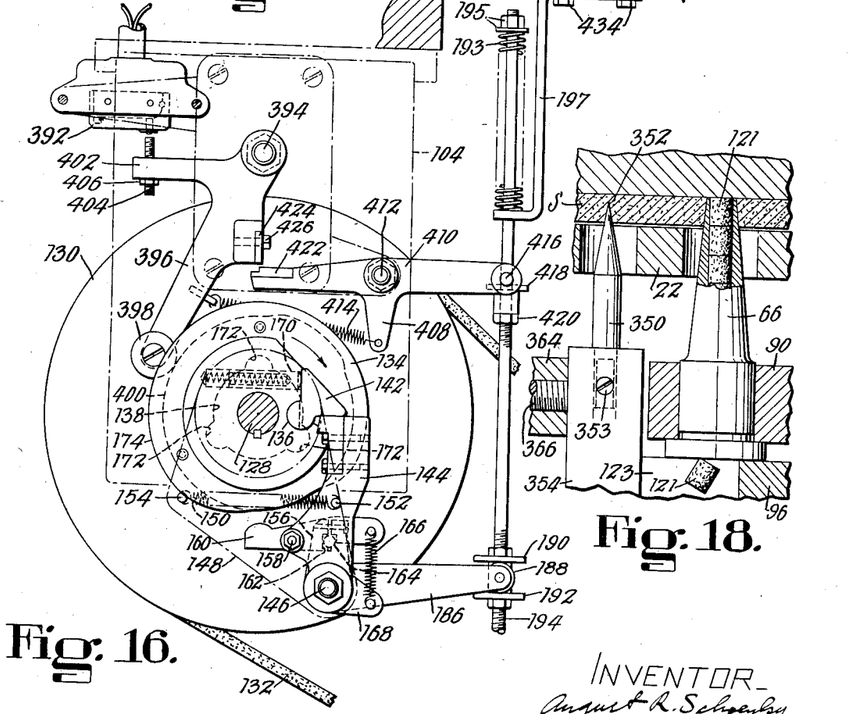
Fig. 16 is a section on the line XVI—XVI of Fig. 15.
Fig. 18 is a section on the line XVIII—XVIII of Fig. 17.
Figure 17:
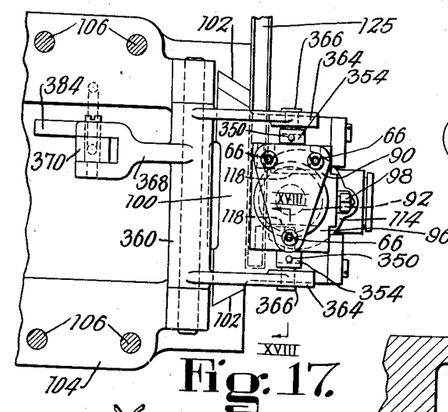
Fig. 17 is a section on the line XVII—XVII of Fig. 15.
Figure 19:
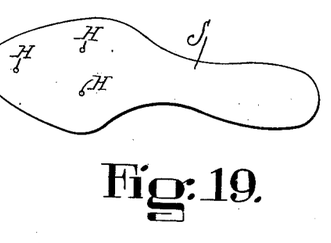
Fig. 19 is a plan view of an insole as it appears after it has been operated upon by the machine.

The punches 66 (Fig. 17), herein illustrated as three in number, are preferably hollow and are secured in definitely predetermined relation to one another in a holder 90 provided with a vertical stud 92 arranged to extend into a socket 94 in a block 96 (Fig. 5), a set screw 98 being provided for securing the holder to the block. The block 96 is mounted for vertical adjustment in a slide 100 (Fig. 15) which is vertically movable in guideways 102 formed in a bracket 104 secured by screws 106 to the top plate 33 of the frame 20. Formed on the slide 100 is an outwardly extending inverted L-shaped portion 108 bored to receive a second block 110 which is held against endwise movement as well as turning movement relatively to the slide 100 by means of a substantially U-shaped plate 114 secured to the slide by a screw 116 and the opposite arms of which engage flat surfaces 118 on the block 110 (Fig. 17). The blocks 96 and 110 (Fig. 15) are connected by an oppositely threaded adjusting member 120, the intermediate portion of which is provided with openings 122 to receive the end of a rod by means of which the member 120 may be rotated to adjust the position of the upper block 96 and thus to vary the position of the punches 66 relatively to the anvil 64. For the disposal of the chips 121 (Fig. 18) severed from the work by the hollow punches 66 there are formed in the block 96 passages 123 (Fig. 15) that lead from the punches 66 to a chute 125 for guiding the chips into a receptacle 127 removably mounted on the bracket 104 (Fig. 1).

Figure 15:
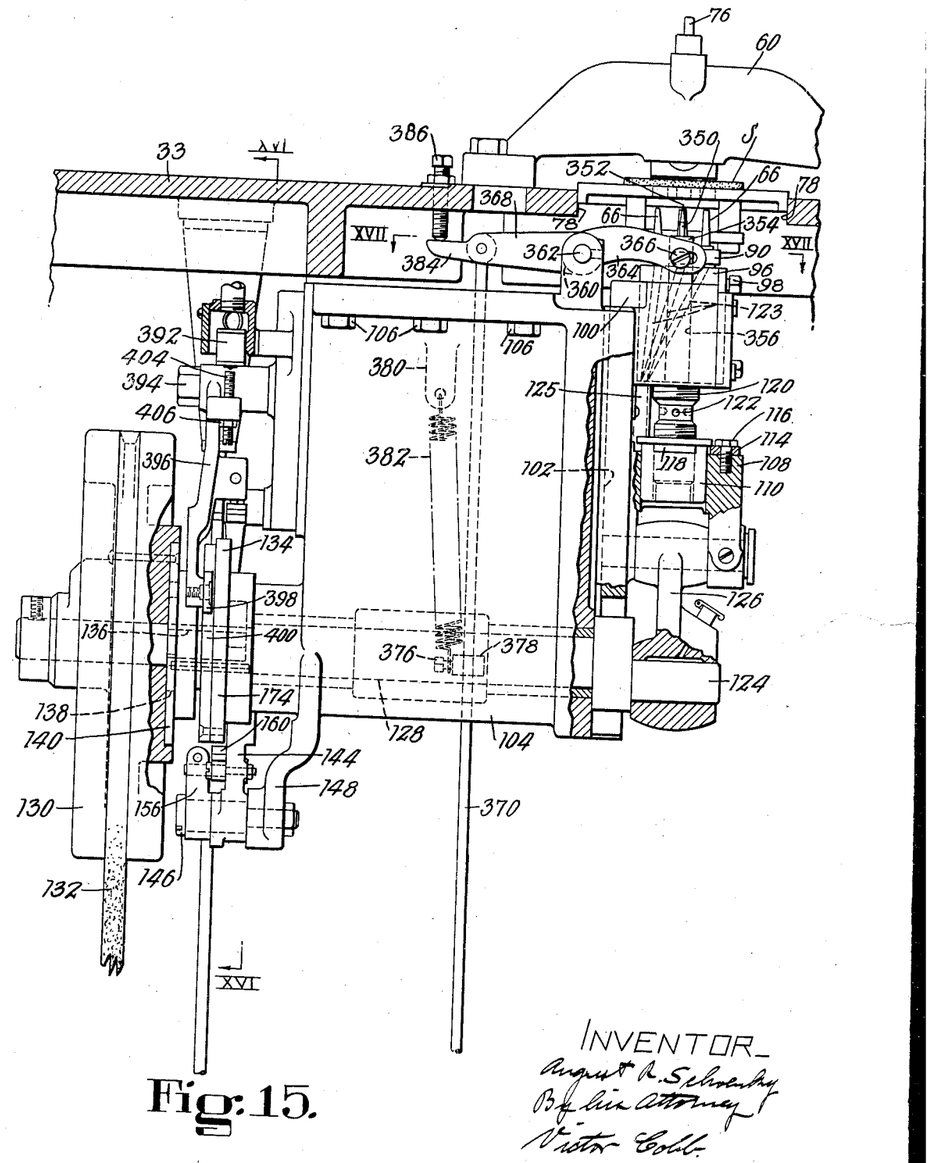
Fig. 15 is an enlarged view, partly in side elevation and partly in section, of a portion of the machine shown in Fig. 1, illustrating the means for operating the punching tools and the insole holding means and associated parts.

The slide 100 is reciprocated vertically to operate the punches 66 by a crank 124 to which the slide is connected by a link 126 (Fig. 15). The crank is formed on the end of a shaft 128 rotatably mounted in suitable bearings formed in the bracket 104, and loosely mounted on the opposite end portion of the shaft is a pulley 130 continuously driven by means of a belt 132 from any convenient source of power, such, for example, as an electric motor 129. A one-revolution clutch of any suitable or preferred type may be provided to form a driving connection between the pulley 130 and the crank shaft 128. In the illustrated construction, the driven member of the clutch comprises a cam wheel 134 which is keyed to the shaft 128 and in which there is rotatably mounted a rocker 136 (Fig. 16), the left-hand end portion of which as viewed in Fig. 15 is semicylindrical in cross-section and extends through a central opening 138 formed in a plate 140 fast to the pulley 130. The cam wheel 134 is recessed to provide clearance for the head 142 of the rocker 136 which projects far enough from the recess to be engaged by a starting and stopping lever 144. The lever 144 is loosely mounted on a stud 146 threaded into a downwardly projecting portion 148 on the bracket 104 and is held in its effective or stopping position by a spring 150 connected at one end to a pin 152 in the lever 144 and at the other end to a pin 154 in the bracket 104. Also loosely mounted on the stud 146 is a bell-crank lever 156 which carries a pin 164 that extends into a recess 162 in a latch 160 which is pivotally connected at 158 to the lever 144. A spring 166 extending between one end of the latch 160 and a lateral projection 168 on the lever 144 acts to maintain the parts in the positions indicated in Fig. 16. The construction is such that when the lever 156, and through the latch 160 the lever 144, is swung in a clockwise direction (Fig. 16) by means hereinafter described, the rocker 136 is released to the action of a spring-pressed plunger 170 in the cam wheel 134, the plunger acting to rotate the rocker 136 in a clockwise direction when one or the other of a plurality of recesses 172 in the plate 140 is moved into alinement with the rocker, thus connecting the pulley 130 and the crank shaft 128. Swinging movement of the lever 156 in the direction to operate the lever 144 to release the rocker 136 carries one end of the latch 160 into engagement with a cam face 174 on the cam wheel 134. The shape of the cam face 174 is such that at a predetermined time in the cycle the latch is swung against the resistance of the spring 166 in a direction to release the lever 144 to the action of the spring 150 which returns the lever 144 to its initial position in which it acts by engagement with the head 142 of the rocker 136 to cause rotation of the rocker in a direction to disconnect the pulley 130 and the crank shaft 128 at the end of one complete reciprocation of the punches 66.

For determining the proper position of each sole on the support 22 relatively to the punches 66, the illustrated machine is provided with gaging means comprising a toe gage 176, a pair of gages 178, 180 for engaging the edge face of the sole at the opposite sides of the toe end, and a pair of gages 182, 184 for engaging the edge face of the sole at its opposite sides at a substantially greater distance from the toe gage 176 than the side gages 178, 180. As more particularly hereinafter explained, the side gages 178, 180 and 182, 184 of each pair are connected together for movement toward or from each other to position the forepart of each sole with its "center line" in predetermined relation to the punches 66, means being provided for independently adjusting the two pairs of side gages laterally of the sole and for also adjusting the toe gage 176 in directions lengthwise of the sole relatively to the punches 66 to accommodate soles of widely varying sizes and styles. To cause the starting of the power operation of the machine to be dependent upon the correct positioning of the work relatively to the punches 66, means is provided for operating the starting lever 144 when the work is presented in the position determined by the above-mentioned toe and side gages. As shown particularly in Fig. 16, the bell crank lever 156 has a laterally extending arm 186 provided with a roll 188, the opposite sides of which are engaged by collars 190, 192 threaded on a downwardly extending rod forming an armature 194 of a solenoid 196 (Figs. 1 and 14) mounted on the frame 20. When the solenoid 196 is energized, downward movement is imparted to the armature 194 to swing the bell-crank lever 156 in the direction to release the rocker 136 to the action of the spring-pressed plunger 170 to connect the crank shaft 128 and the pulley 130, thus starting the power operation of the machine. Downward movement of the rod 194 is limited by engagement of an adjustable collar 189 on the rod with a portion of a cover plate 191 for the solenoid 196 (Fig. 1). When the solenoid 196 is deenergized, the rod or armature 194 is moved upward to its initial starting position, in which position the pin 164 again engages the latch 160 in the recess 162 in the latch, by a spring 193 that surrounds the upper end portion of the rod 194 between a nut and washer 195 on the upper end of the rod and a bracket 197 secured to the top plate 38.

Figure 4:
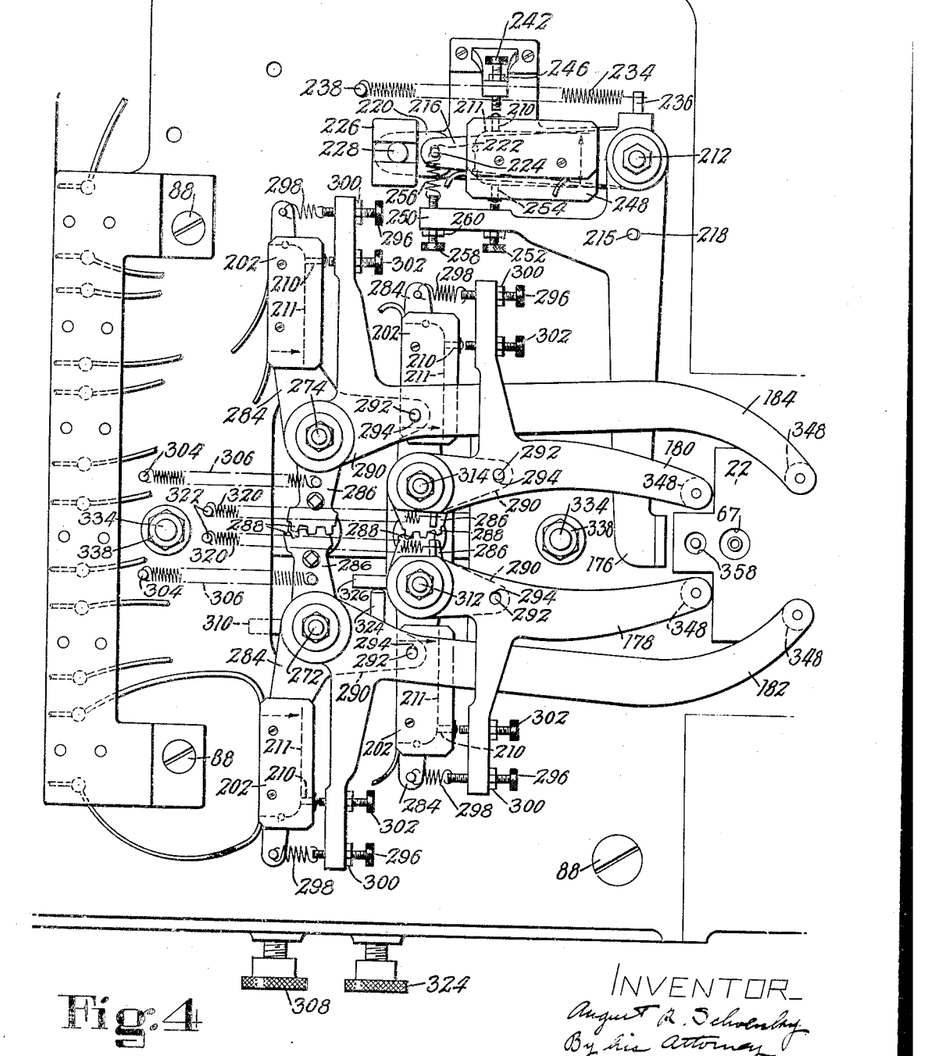
Fig. 4 is an enlarged plan view of the gaging devices and associated parts.

Conductors 198 (Fig. 14) join the winding of the solenoid 196 with a source of supply of current 200. The conductors 198 pass in series through a plurality of switches 202, a relay switch 204 being provided, for purposes hereinafter more particularly explained, between the switches 202 and the solenoid 196. The closing of the switches 202 is controlled by the above-mentioned toe and side gages, the construction being such that when all of the switches have been closed, the coil of the relay switch 204 is energized, thus closing relay contacts 206, 208 and causing immediate energization of the solenoid 196. The switches 202 (Fig. 4), herein illustrated as five in number, are associated, one with each of the above-mentioned toe and side gages, and are preferably of the snap type, each switch being provided with a plunger 210 the inner end of which engages a resilient contact arm 211 which is swung in a direction to close the switch in response to a slight movement of depression of the plunger 210. These switches are not herein shown in detail, since they are substantially like that fully shown in Letters Patent of the United States No. 1,960,020, granted May 22, 1934, on an application of P. K. McGall.

Figures 10, 11:
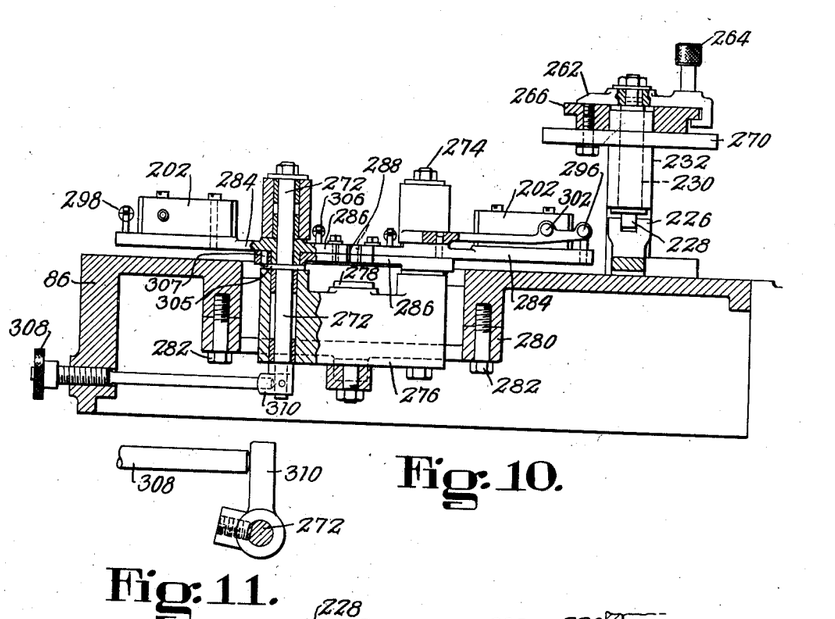
Fig. 10 is a section on the line X—X of Fig. 2.
Fig. 11 is a detail plan view of parts shown in Fig. 10.
Figures 12, 13:
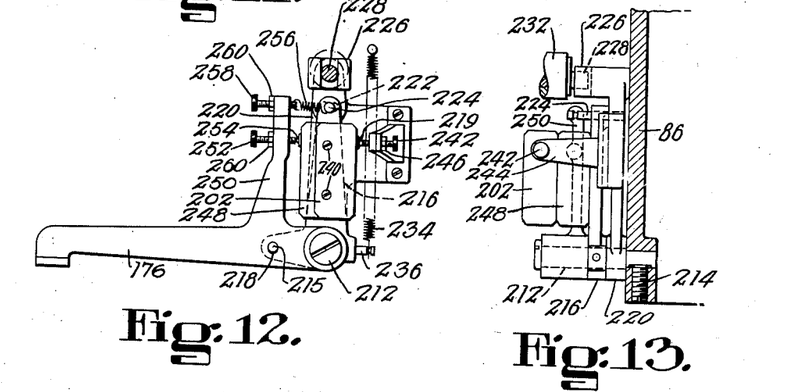
Fig. 12 is a plan view on an enlarged scale of the toe gaging device and associated parts.
Fig. 13 is a view in side elevation of the parts shown in Fig. 12.

The toe gage 176, comprising a bell-crank lever, is pivotally mounted on a shouldered pin 212 which projects upwardly from the bracket 86 and is secured to the bracket by a set screw 214 (Fig. 13). Loosely mounted on the pin 212 is an arm 216 provided with an upwardly projecting pin 215 (Figs. 12 and 13) extending into a slot 218 in the bell-crank lever 176, and an arm 220 provided with a slot 222 into which extends a pin 224 carried by the arm 216. The arm 220 has formed on its free end an upwardly extending boss 226 provided with a slot to receive the reduced end portion 228 of a short vertical shaft 230 rotatably mounted in a boss 232 on the bracket 86 (Fig. 10). A spring 234, connected at one end to a pin 236 projecting from the hub of the arm 216 and at the other end to a pin 238 projecting from the bracket 86 (Fig. 4), tends to swing the arm 216 in a direction to hold the pin 224 in engagement with the arm 220 at the left-hand end of the slot 222 in that arm (Fig. 12). Secured to the arm 216 by screws 240 is one of the above-mentioned five switches 202, the plunger 210 of which is arranged to be depressed to close the switch by engagement with an adjustable screw 242 carried by an upwardly extending projection 244 on the arm 220 in response to swinging movement of the toe gage 176 and the arm 216 in a clockwise direction (Fig. 12). For holding the screw 242 in adjusted position, there is provided a lock nut 246. Also secured to the bell-crank lever 216 by the screws 240 is a second snap switch 248, and carried by one arm 250 of the end gage 176 is an adjustable screw 252 held in engagement with the plunger 254 of the switch 248 by a light spring 256 connected at one end to the pin 224 in the arm 216 and at the other end to an adjustable screw 258 in the arm 250, lock nuts 260 being provided for holding the screws 252, 258 in adjusted positions. Preferably the tension of the spring 256 is such that the screw 252 is held in engagement with the plunger 254 without sufficient pressure being exerted upon the plunger to depress it far enough to close the switch 248 and with the pin 215 carried by the arm 216 in engagement with the toe gage 176 at the upper end of the slot 218 in the toe gage (Fig. 12). Since the construction of the switches 202 and 248 is such that only a slight movement of depression of their plungers 210 and 254 is necessary to close the switches, the slot 218 is preferably only large enough to permit such slight movement of the toe gage 176 relatively to the arm 216 as is necessary to depress the plunger 254 far enough to close the switch 248. It will be understood that the switch 202 associated with the toe gage 176 is closed after the closing of the switch 248 by engagement of its plunger 210 with the screw 242 in response to movement of the toe gage and the arm 216 relatively to the arm 220 permitted by the pin and slot connection 222, 224.

Figure 3:
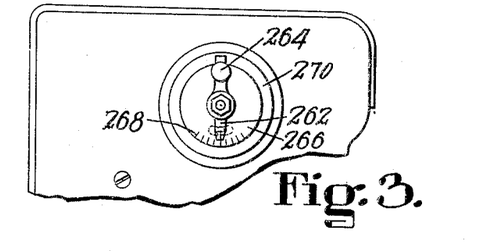
Fig. 3 is a detail plan view of a portion of the mechanism for adjusting the toe gaging device.

Fast to the upper end of the shaft 230 is a pointer 262 (Fig. 10) provided with a handle 264 for turning it to rotate the shaft 230. The reduced end portion 228 of the shaft 230 is eccentric to the axis of rotation of the shaft, so that by turning the pointer, the shaft may be rotated to swing the arm 220 and with it the arm 216 and the toe gage 176 about the pivot pin 212 to vary the position of the toe gage to accommodate soles of different styles. Formed on a plate 266 fast to a flange 270 on the boss 232 is a scale 268 (Fig. 3) cooperating with the pointer 262 to indicate different adjusted positions of the toe gage for soles of different styles.

Since the two pairs of side gages 178, 180 and 182, 184 and associated parts are substantially alike in construction, a description of one pair will suffice for both. The two side gages 182, 184 (Figs. 2 and 4), each comprising a bell-crank lever, are pivotally mounted on vertical studs 272, 274 carried by a bracket 276 pivotally mounted on a vertical stud 278 carried by a bracket 280 secured to the bracket 86 by screws 282 (Figs. 5 and 9). Loosely mounted on the studs 272, 274 are levers 284 (Fig. 4), the inwardly extending arms 286 of which have meshing gear segments 288. Each lever 284 has formed thereon a projection 290 carrying a pin 292 that extends upwardly into a slot 294 in its associated side gage 182, 184, and secured to each lever 284 is one of the above-mentioned snap switches 202. Each side gage 182, 184 carries an adjustable screw 296 between which and its associated lever 284 there extends a light spring 298, a lock nut 300 being provided for holding the screw 296 in adjusted position. The springs 298 tend to hold the side gages in the positions indicated in Fig. 4 with adjustable screws 302 carried by the side gages in engagement with the plungers 210 of the switches 202, and with the pins 292 engaging the side gages in such relation to the slots 294 in the side gages as to permit such slight movement of the side gages relatively to the levers 284 as is necessary to cause the adjustable screws 302 to depress the plungers 210 far enough to close the switches 202. It will be understood that the slots 294 are preferably only large enough to permit such slight relative movement between the side gages and their associated bell-crank levers 284 as is necessary to operate the plungers 210 to close the switches. The studs 272, 274 are rotatably mounted in the bracket 276, and each stud has formed thereon a collar 305 (Fig. 10) provided with an opening to receive a pin 307 that extends downwardly from its associated bell-crank lever 284. Extending between the arms 286 of the bell-crank levers 284 and pins 304 in the bracket 86 (Fig. 4) are springs 306 that tends to swing the bell-crank levers and, through the pin-and-slot connections 292, 294, the side gages 182, 184 in directions to move the free end of the gages toward each other, this movement of the gages being limited by the engagement of an adjustable stop screw 308 in the bracket 86 with an arm 310 secured to the lower end of the stud 272 (Figs. 10 and 11).

The pair of side gages 178, 180 and their associated bell-crank levers 284 are pivotally mounted on vertical studs 312, 314 (Fig. 4) that are rotatably mounted in a bracket 316 (Fig. 5) which is pivotally mounted on a shouldered stud 318 carried by the bracket 280. Springs 320 (Fig. 4), connected at one end to pins 322 in the bracket 86 and at their opposite ends to the inwardly extending arms 286 of the bell-crank levers 284, tend to swing the bell-crank levers and the side gages 178, 180 in directions to move the free end of the side gages toward each other, this movement of the side gages being limited by engagement of a stop screw 324 with an arm 326 secured to the stud 312, similar to the arm 310 associated with the stud 272.

For adjusting the two side gages of each pair laterally of the sole support, the brackets 276 and 316 are provided respectively with laterally extending arms 328, 330 (Fig. 5), each arm being forked to straddle a block 332 through which extends the body portion of a bolt 334 extending upwardly through an eccentric bushing 336 in the bracket 86, a nut 338 being threaded on the upper end of the bolt 334 and a washer 340 being provided between the nut and the head 342 of the bushing 336. Each bolt 334 has a head 344 for engaging the bottom face 346 of the forked portion of its associated arm 328, 330. It will be evident that by loosening the nuts 338 and rotating the bushings 336 the two side gages of each pair may be shifted bodily in either direction laterally of the sole support 22 to position them in the desired relation to the punches 66, after which by tightening the nuts 338 the arms 328, 330 may be clamped to the bracket 86 to hold the brackets 276 and 316 against rotation on the studs 278, 318, with the two pairs of side gages in adjusted positions. It will be observed that the punches 66 are arranged, one near the toe gage 176 and the other two farther rearwardly and at an equal distance from a straight line which passes through the other punch 66 and the toe gage 176. Each side gage is provided with a roll 348 (Fig. 4) for engaging the edge face of the insole, and preferably the side gages will be so adjusted that the two rolls 348 of each pair will be located at equal distances from the above-mentioned line. The rolls 348 are preferably of sufficient length to accommodate insoles of different thicknesses, as well as ribbed insoles of the Goodyear welt type. It will be understood that by turning the hand wheel 54 the heightwise position of the sole support 22 relatively to the anvil 64 may be adjusted to accommodate insoles of different thicknesses, the support 22 being preferably so adjusted as to permit a slight clearance for the insertion of an insole between the support and the anvil. It will be understood also that by adjustment of the screws 308, 324, the spaced apart positions of the two side gages of each pair may be varied to accommodate insoles of different sizes and that by adjustment of the pointer 262 the position of the end gage 176 may be varied to accommodate insoles of different styles.

It will be evident that as an insole is moved longitudinally on the support 22 into engagement with the end gage 176, the insole will be positioned by the two pairs of side gages relatively to the punches 66 with the "center line" of its forepart in the plane determined by the above-mentioned straight line passing through one of the punches 66 and the end gage 176. Pressure of the insole on the two pairs of side gages will cause such slight movement of the side gages relatively to their associated bell-crank levers 284 as is necessary and permitted by the pin-and-slot connections 292, 294 to close the four switches 202 associated with the two pairs of side gages by the action of the screws 302 on the plungers 210 of the switches. Similarly, pressure of the insole against the end gage 176 will first cause the switch 248 to be closed, after which the toe gage 176 and the bell-crank lever 216 will be swung relatively to the arm 220 to cause the closing of the fifth switch 202. As previously pointed out, closing of all five of the switches 202 will cause the coil of the relay switch 204 to be energized, thus closing the contacts 206, 208 and causing immediate energization of the solenoid 196 to start the power operation of the machine. By reference to Fig. 14, which shows diametrically the circuit connections for the machine, it will be seen that the switch 248 associated with the end gage 176 is bridged across the five switches 202 to provide a holding circuit for the relay switch 204. Preferably the slot 222 is somewhat longer than the slot 218 so that a considerably greater amount of movement of the end gage 176 is necessary to cause opening of the switch 248. Thus substantial insurance is afforded against repetition of the operation of the machine such as might otherwise occur through deenergization and then energization of the solenoid 196 because of the opening and closing of one or more of the five series switches 202 due to vibration in the machine produced by the reciprocation of the punches 66. It will be understood that with the toe gage 176 adjusted for the style of the insole to be operated upon and with the screws 308, 324 positioned so that the two side gages of each pair will be held by their springs 306 and 320 in their innermost positions somewhat nearer together than the width of the insole at a corresponding distance from the toe end, when the insole has been moved by the operator in engagement with all of the gages it will occupy a definite predetermined position longitudinally, laterally, and angularly relative to the sole support 22 and the punches 66.

The illustrated machine is further provided with means for holding the insole in the position determined by the gages for the operation of the punches 66. This means comprises a pair of members 350 (Fig. 5) having their upper end portions tapered to form stab points 352 adapted to penetrate the insole. The members 350 are secured by screws 353 to holders 354 vertically movable in guideways 356 formed in the slide 100 at opposite sides of the block 96. The sole support 22 is provided with openings 358 (Fig. 6) through which the members 350 are reciprocated partially to pierce the insole substantially at the beginning of the cycle and then to release the insole after the operation of the punches 66 by the rocking of a bell-crank lever 360 (Fig. 15) pivotally connected at 362 to the bracket 104. The bell-crank lever 360 (Fig. 17) is provided with a pair of laterally extending arms 364 having pin-and-slot connections 366 with the holders 354 and with an oppositely extending arm 368 to which there is pivotally connected a downwardly extending rod 370 connected at its lower end to the armature 372 of a solenoid 374 mounted on the frame 20 (Fig. 1). Secured to the rod 370 by a set screw 376 (Fig. 15) is a collar 378, and connected to the screw 376 and at the other end to a lug 380 on the bracket 104 is a spring 382 which tends to swing the lever 360 in the direction to move the insole holding members 350 out of engagement with the insole and to hold the lever 360 with a projection 384 on the arm 368 in engagement with an adjustable screw 386 in the top plate 33.

The solenoid 374 (Fig. 14) is connected with the current source 200 and with the contact points 388 of a relay switch 390, the coil of which is controlled by the contact points 206 of the relay switch 204, the circuit from the contact points 206 to the coil of the relay switch 390 including a mechanically operated release switch 392 normally held closed. It will be evident that when the coil of the relay switch 204 is energized in response to the closing of the previously mentioned five switches 202 controlled by the toe and side gages, the contact points 206 will be closed, thus causing energization of the coil of the relay switch 390 to close the contact points 388. This causes immediate energization of the solenoid 374, with the result that the rod 370 is moved downwardly to swing the bell-crank lever 360 in the direction to operate the insole holding members 350 partially to pierce the insole. Downward movement of the rod 370 is limited by engagement of an adjustable collar 393 on the rod with a portion of the cover plate 191 for the solenoids (Fig. 1).

Pivotally connected at 394 to the bracket 104 (Fig. 16) is an arm 396 carrying a cam roll 398 arranged to engage a cam path 400 formed on the cam wheel 134 fast to the shaft 128. Formed on the arm 396 is a projection 402 carrying an adjustable screw 404 held in adjusted position by a nut 406. Extending between the arm 396 and a projection 408 on a lever 410 pivotally connected at 412 to the bracket 104 is a spring 414 which acts normally to swing the arm 396 in the direction to hold the roll 398 in engagement with the cam 400 and to swing the lever 410 in the direction to hold a pin 416 projecting from one end of the lever in engagement with a collar 418 which is threaded on the rod 194 and is held in adjusted position by a lock nut 420. The shape of the cam 400 is such that after the punches 66 have been operated to form the positioning holes in the insole, the arm 396 is swung in the direction to cause the screw 404 to open the release switch 392, thereby disconnecting the relay switch 390 and the contact points 296 of the relay switch 204. This causes immediate deenergization of the solenoid 374, thereby permitting the spring 382 to swing the bell-crank lever 360 in the direction to operate the holding members 350 to release the insole. It will be understood that at this time the rod 194 is in its lowermost position, with the collar 418 out of engagement with the pin 416. Accordingly as the arm 396 is thus swung by the cam 400, the spring 414 acts to swing the lever 410 in the direction to move a notched plate 422 secured to the opposite end of the lever 410 into position to engage a plate 424 carried by the arm 396, thus locking the arm 396 in the position into which it has been moved by the cam 400 to open the switch 392.

As previously pointed out, at the end of one complete rotation of the shaft 128 to reciprocate the punches 66, the pulley 129 and the shaft 128 are disconnected in response to the action of the lever 144 on the rocker 136. Thereafter, the operator removes the insole from the machine, thus permitting the five switches 202 and the switch 248 to open and the solenoid 196 to become deenergized. This releases the rod 194 to the action of the spring 193 which moves the rod upwardly to its initial starting position (Fig. 16). As the rod 194 moves upwardly the collar 418 on the rod 194 engages the pin 416 carried by the lever 410 and swings the lever in the direction to release the arm 396 to the action of the spring 414 for return movement to the position shown in Fig. 16, with the roll 398 again in engagement with the cam 400 and the release switch 392 closed.

Figure 14:
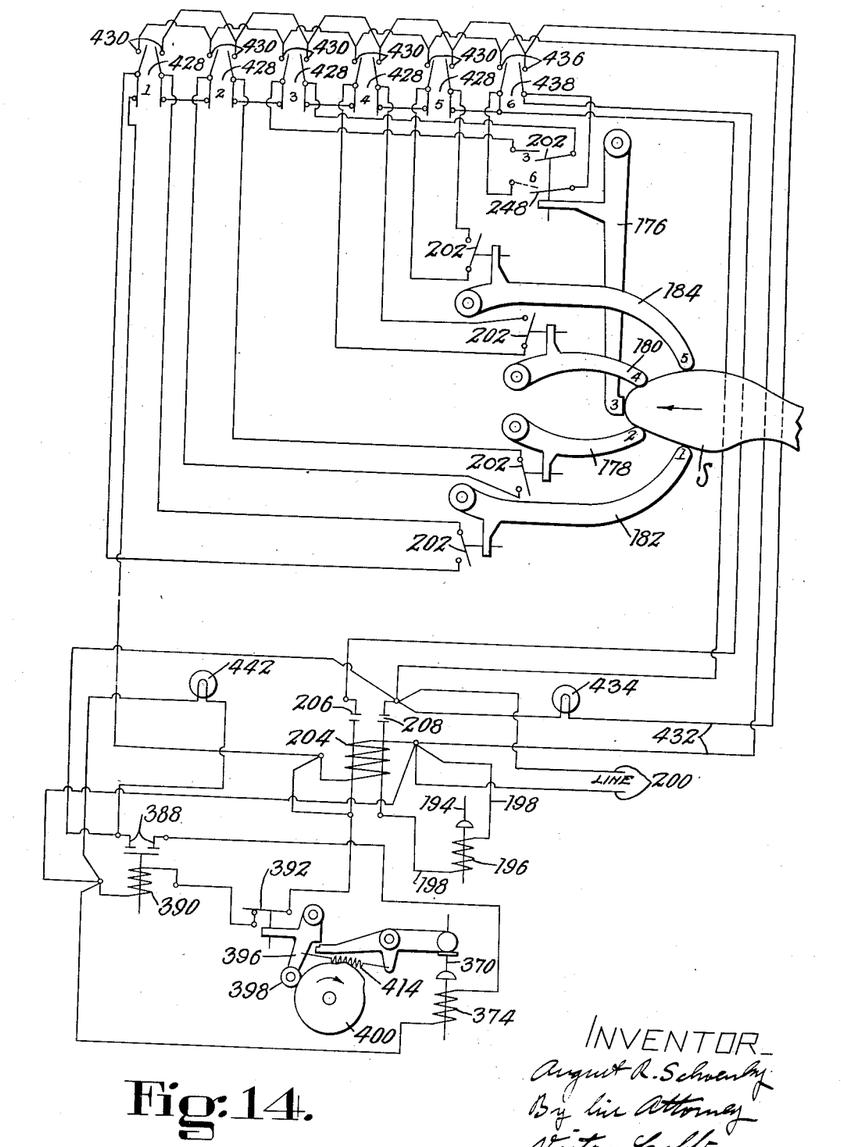
Fig. 14 is a diagram showing the circuit connection for the machine.

By reference to Fig. 14, it will be seen that the circuit through the five switches 202 contains five double-pole, double-throw switches 428 connected in series through one set of contact points. Each switch 428 has its movable arms or blades bridged across the contact points of one of the switches 202. It will be understood that one side of each switch 248 is normally held closed to complete the circuit through the relay coil 204 and the solenoid 196 when all of the five switches 202 are closed. From the contact points 430 associated with the normally inoperative blades of the switches 428 taps lead to a test circuit 432 connected to the current source 206 and in which there is a light 434. Taps also lead from the test circuit 432 to the contact points 436 associated with the normally inoperative blades of a sixth double-pole, double-throw switch 438, the movable blades of which are bridged across the contact points of the switch 248 associated with the end gage 176. Each of the switches 428, 438 may be operated by depression of a button 440 (Fig. 1) to disconnect one of the switches 202 or the switch 248 from its normal operating circuit and connect it to the testing circuit. This testing circuit affords the operator convenient means for readily determining whether the above-mentioned screws 242, 252 and 302 are in properly adjusted positions. If, for example, the machine fails to start after an insole has been placed in the machine in pressing engagement with all of the gages, the operator may successively press the buttons 440 associated with the toe and side gages and by watching the light 434 determine which screw requires adjustment. He may then remove the insole from the machine and adjust that screw requiring adjustment so that the switch associated with the gage carrying the screw will be closed in response to the limited movement of the gage relatively to the switch. If the light 434 shows that the switch 202 associated with the toe gage 176 is not closed in response to the movement of the toe gage and the arm 216 relatively to the arm 220, the screw 242 should be adjusted so as to effect closing of that switch 202 substantially at the time when the pin 224 engages the arm 220 at the end of the slot 222 to limit movement of the toe gage and arm 216 relatively to the arm 220. Conveniently, also, a light 442 is shown in the circuit between the current source and the relay switch 390 as a means to enable the operator to determine whether all of the various circuits are functioning properly.

In the operation of the machine, with the parts in the positions shown in Fig. 2 and with the toe and side gages properly adjusted for the size and style of insole to be operated upon, an insole S will be laid upon the sole support 22 by the operator and moved lengthwise toward the toe gage 176 and between the two pairs of side gages 178, 180 and 182, 184. As the insole is thus moved, the side gages of each pair will be moved relatively to their respective bell-crank levers 284 and against the resistance of the resilient contact arms 211 of the switches 202 the amount permitted by the pin-and-slot connections 292, 294 to cause the screws 302 to depress the plungers 210 far enough to close the switches, after which the side gages of each pair and their respective switches will be moved away from each other against the resistance of the springs 306 and 320, the operator allowing the insole to center itself under the action of the side gages. In response to pressure of the insole against the toe gage 176, the toe gage will first move relatively to the arm 216 against the resistance of the resilient contact arm of the switch 248 an amount permitted by the pin-and-slot connections 215, 218 to cause the screw 252 to operate the plunger 254 to close the switch 248, after which the toe gage 176 and arm 216 will move relatively to the arm 220 the amount permitted by the pin-and-slot connections 222, 224 to cause the screw 242 to operate the plunger 210 to close the switch 202 on the arm 216. With all five of the switches 202 closed, the coil of the relay switch 204 and the solenoid 196 are immediately energized to start the power operation of the machine, the circuit through the relay switch 390 being also immediately closed to light the light 442 and to cause energization of the solenoid 374. The members 350 are accordingly operated to pierce part way through the insole substantially at the beginning of the operation of the machine and before the punches 66 have been moved upwardly far enough to engage the insole. The insole is thus held by the members 350 in the position determined by the toe and side gages during the continued upward movement of the punches 66 to form the positioning holes H in the insole. As the punches 66 are returned to their lowermost positions, the cam 400 acts to swing the arm 396 in the direction to open the switch 392, thereby causing deenergization of the solenoid 374. As the solenoid 374 is deenergized, the rod 370 and the bell-crank lever 360 are released to the action of the spring 382 to move the members 350 out of engagement with the insole. Thereafter the operator removes the insole S from the machine, thus permitting the switches 202, 243 to open and the solenoid 196 to become deenergized. Deenergization of the solenoid 196 permits the spring 193 to move the rod 194 upwardly, thereby returning the bell-crank lever 156 and the lever 410 to their initial starting positions, the spring 414 acting to swing the arm 396 into the position indicated in Fig. 15 to permit closing of the release switch 392.

Having described the invention, what I claim as new and desire to secure by Letters Patent of the United States is:

1. In a machine for operating upon work, an operating tool, gaging means for determining the position of the work longitudinally, laterally and angularly relatively to said operating tool, means for holding the work in the position determined by said gaging means for the operation of said operating tool, and means actuated by contact of the work with said gaging means for moving said holding means from its idle position into holding engagement with the work.

2. In a machine for operating upon work, an operating tool, a plurality of gages for determining the position of the work relatively to said operating tool, means for holding the work in the position determined by said gages for the operation of said operating tool, and means for operating said holding means in response to pressure of the work against all of said gages.

3. In a machine for operating upon work, an operating tool, gaging means comprising a plurality of gages movable in response to pressure of a work piece against them when presented by the operator to determine the position of the work piece relatively to said operating tool, means for holding the work piece in the position determined by said gages for the operation of said operating tool, and means for operating said holding means in response to movement of all of said gages by pressure of the work piece against them.

4. In a machine for operating upon work, an operating tool, gaging means comprising a plurality of gages relatively movable in response to pressure of a work piece against them when presented by the operator to determine the position of the work piece relatively to said operating tool, means for holding the work piece in the position determined by said gages for the operation of said operating tool, operating means for said holding means, and means for rendering said operating means operative only when the work piece has been moved by the operator into the position determined by all of said gages.

5. In a machine for operating upon work, an operating tool, gaging means comprising a plurality of gages movable in response to pressure of a work piece against them when presented by the operator to determine the position of the work piece relatively to said operating tool, means for holding the work piece in the position determined by said gages for the operation of said operating tool, operating means for said holding means, and controlling means for said operating means actuated by the movement of all of said gages to position the work piece.

6. In a machine for operating upon work, an operating tool, gaging means comprising a plurality of gages movable in response to pressure of a work piece against them when presented by the operator to determine the position of the work piece relatively to said operating tool, a work clamp for holding the work piece in the position determined by said gages for the operation of said operating tool, operating means for said work clamp, and means for rendering said operating means operative only when the work piece has been moved by the operator into the position determined by all of said gages.

7. In a machine for operating upon work, an operating tool, gaging means for determining the position of the work longitudinally, laterally and angularly relatively to said operating tool, a work holder for holding the work in the position determined by said gaging means for the operation of said operating tool, and electrical means actuated by contact of the work with said gaging means for moving said work holder from its idle position into holding engagement with the work.

8. In a machine for operating upon work, an operating tool, a plurality of gages for determining the position of the work relatively to said operating tool, means for holding the work in the position determined by said gages for the operation of said operating tool, electro-magnetic means for operating said holding means, an energizing circuit for said electro-magnetic means, and a switch for each of said gages arranged to be closed in response to pressure of the work against the gage, said switches being arranged in series to control the energizing circuit.

9. In a machine for operating upon work, an operating tool, a plurality of gages for determining the position of the work relatively to said operating tool, means for holding the work in the position determined by said gages for the operation of said operating tool, a solenoid for operating said holding means, an energizing circuit for said solenoid, a contact device for each of said gages arranged to be closed in response to pressure of the work against the gage, said devices being arranged in series to control the energizing circuit, and a contact device in parallel with said series devices for maintaining said energizing circuit closed regardless of the opening of any of said series devices.

10. In a machine for operating upon work, an operating tool, a plurality of gages for determining the position of the work relatively to said operating tool, means for holding the work in the position determined by said gages for the operation of said operating tool, a solenoid for operating said holding means, an energizing circuit for said solenoid, a relay for closing said energizing circuit, an energizing circuit for said relay, and means controlled by all of said gages for closing said last-named circuit.

11. In a machine for operating upon work, an operating tool, a plurality of gages for determining the position of the work relatively to said operating tool, means for holding the work in the position determined by said gages, a solenoid for operating said holding means, an energizing circuit for said solenoid, a relay for closing said energizing circuit, an energizing circuit for said relay, and a contact device associated with each of said gages and arranged to be closed by pressure of the work against the gage, said devices being arranged in series to control said last-named circuit.

12. In a machine for operating upon work, an operating tool, gaging means for determining the position of the work longitudinally, laterally and angularly relatively to said operating tool, means for holding the work in the position determined by said gaging means for the operation of said tool, and means actuated by contact of the work with said gaging means for moving said holding means from its idle position into holding engagement with the work and for operating said tool.

13. In a machine for operating upon work, an operating tool, a plurality of gages for determining the position of the work relatively to said operating tool, means for holding the work in the position determined by said gages for the operation of said operating tool, and means controlled by all of said gages for operating the holding means and said operating tool.

14. In a machine for operating upon work, the combination with an operating tool, power-driven means for operating said tool, and mechanism for starting said power-driven means in operation, of a plurality of gages for determining the position of the work relatively to said operating tool, means for holding the work in the position determined by said gages for the operation of said operating tool, and means controlled by all of said gages for operating said holding means and said starting mechanism.

15. In a machine for operating upon work, the combination with an operating tool, power-driven means for operating said tool, and a clutch through which said power-driven means is operated, of a plurality of gages for determining the position of the work relatively to said operating tool, means for holding the work in the position determined by said gages for the operation of said operating tool, and means controlled by all of said gages for operating said holding means and for also actuating said clutch to start said power-driven means in operation.

16. In a machine for operating upon work, the combination with an operating tool, power-driven means for operating said tool, and mechanism for starting said power-driven means, of a plurality of gages for determining the position of the work relatively to said operating tool, means for holding the work in the position determined by said gages for the operation of said operating tool, separate devices for operating said holding means and said starting mechanism, and means controlled by all of said gages for operating said separate devices.

17. In a machine for operating upon work, the combination with power-driven means for operating upon a work piece, and mechanism for starting said power-driven means in operation, of a plurality of gages for determining the position of the work piece relatively to said power-driven means, and electrical means controlled by all of said gages for operating said starting mechanism.

18. In a machine for operating upon work, the combination with power-driven means for operating upon a work piece, and mechanism for starting said power-driven means in operation, of a plurality of gages for determining the position of a work piece relatively to said power-driven means, electro-magnetic means for operating said starting mechanism, an energizing circuit for said electro-magnetic means, and a switch associated with each of said gages and arranged to be closed in response to pressure of the work piece against the gage, said switches being arranged in series to control the energizing circuit.

19. In a machine for operating upon work, the combination with power-driven means for operating upon a work piece, and mechanism for starting said power-driven means in operation, of a plurality of gages for determining the position of a work piece relatively to said power-driven means, a solenoid for operating said starting mechanism, an energizing circuit for said solenoid, and a contact device for each of said gages relatively to which its associated gage is mounted for limited movement to close the device in response to pressure of the work piece against the gage, said devices being arranged in series to control the energizing circuit.

20. In a machine for operating upon work, the combination with power-driven means for operating upon a work piece, and mechanism for starting said power-driven means in operation, of a plurality of gages for determining the position of a work piece relatively to said power-driven means, a solenoid for operating said starting mechanism, an energizing circuit for said solenoid, a contact device associated with each of said gages, each gage being mounted for limited movement relatively to its associated contact device to close the device in response to pressure of the work piece against the gage, said contact devices being arranged in series to control said energizing circuit, and a contact device in parallel with said series devices for maintaining said energizing circuit closed, said parallel device being closed in response to the movement of one of said gages and prior to the closing of said series devices.

21. In a machine for operating upon work, the combination with power-driven means for operating upon a work piece, and mechanism for starting said power-driven means in operation, of a plurality of gages for determining the position of a work piece relatively to said power-driven means, an electrical device for operating said starting mechanism, and connections including a plurality of switches operated by the gages and arranged in series with the electrical device for controlling the operation of said electrical device in response to pressure of the work piece against all of said gages.

22. In a machine for operating upon work, the combination with power-driven means for operating upon a work piece, and mechanism for starting said power-driven means in operation, of an electrical device for operating said starting mechanism, a plurality of gages for determining the position of the work piece relatively to said power-driven means, a switch associated with each of said gages, each gage being mounted for limited movement relatively to its associated switch to close it in response to pressure of the work piece against the gage, said switches being arranged in series to control the operation of said electrical device, a testing circuit containing an indicator, and means enabling the operator to connect said testing circuit across any one of said switches to determine whether the switch thus connected is closed in response to the limited movement of its associated gage.

23. In a machine for operating upon work, the combination with power-driven means for operating upon a work piece, and mechanism for starting said power-driven means in operation, of a plurality of gages for determining the position of a work piece relatively to said power-driven means, a solenoid for operating said starting mechanism, an energizing circuit for said solenoid, a contact device associated with each of said gages, each gage being mounted for limited movement relatively to its associated contact device to close the device in response to pressure of the work piece against the gage, said contact devices being arranged in series to control said energizing circuit, a contact device parallel with said series devices for maintaining said energizing circuit closed, a testing circuit containing an indicator, and means enabling the operator to connect said testing circuit across any one of said series devices or the parallel device to determine whether the device thus connected is closed in response to the limited movement of its associated gage.

24. In a machine for operating upon work, the combination with power-driven means for operating upon a work piece, and mechanism for starting said power-driven means in operation, of a plurality of gages for determining the position of a work piece relatively to said power-driven means, a solenoid for operating said starting mechanism, an energizing circuit for said solenoid, a contact device for each of said gages relatively to which its associated gage is mounted for limited movement to close the device in response to pressure of the work piece against the gage, said devices being arranged in series to control the energizing circuit, a testing circuit containing an indicator, and means enabling the operator at will to connect said testing circuit across each of said contact devices to determine whether each contact device is closed by the movement of its associated gage in response to pressure of the work piece against the gage.

25. In a machine for operating upon work, the combination with power-driven means for operating upon a work piece, and mechanism for starting said power-driven means in operation, of a plurality of gages for determining the position of the work piece relatively to said power-driven means, a solenoid for operating said starting mechanism, an energizing circuit for said solenoid, a contact device associated with each one of said gages and arranged to be closed in response to pressure of the work piece against the gage, said contact devices being arranged in series to control the energizing circuit, and means controlled by one of said gages for maintaining said energizing circuit closed regardless of the opening of any of the contact devices.

26. In a machine for operating upon work, the combination with power-driven means for operating upon a work piece, and mechanism for starting said power-driven means in operation, of a plurality of gages for determining the position of the work piece relatively to said power-driven means, a solenoid for operating said starting mechanism, an energizing circuit for said solenoid, a contact device for each of said gages, said contact devices being arranged in series to control the energizing circuit, and a contact device in parallel with said series devices for maintaining said energizing circuit closed.

27. In a machine for operating upon work, the combination with power-driven means for operating upon a work piece, and mechanism for starting said power-driven means in operation, of a plurality of gages for determining the position of the work piece relatively to said power-driven means, a solenoid for operating said starting mechanism, an energizing circuit for the solenoid, a relay for closing said energizing circuit, an energizing circuit for the relay, and means controlled by all of said gages for closing said last-named circuit.

28. In a machine for operating upon work, the combination with power-driven means for operating upon a work piece, and mechanism for starting said power-driven means in operation, of a plurality of gages for determining the position of the work piece relatively to said power-driven means, a solenoid for operating said starting mechanism, an energizing circuit for said solenoid, a relay arranged to close said energizing circuit, an energizing circuit for said relay, and a contact device associated with each of said gages, said contact devices being arranged in series to control said last-named circuit.

29. In a machine for operating upon work, the combination with power-driven means for operating upon a work piece, and mechanism for starting said power-driven means in operation, of a plurality of gages for determining the position of the work piece relatively to said power-driven means, a solenoid for operating said starting mechanism, an energizing circuit for said solenoid, a relay arranged to close said circuit, a circuit for said relay, a plurality of contact devices in said relay circuit, said contact devices being associated one with each of said gages and being arranged in series to control said relay circuit, and a contact device in parallel with said series devices for maintaining said relay circuit closed.

30. In a machine for operating upon work, an operating tool, a plurality of gages for determining the position of the work relatively to said operating tool, means for holding the work in the position determined by said gages, a solenoid for operating said holding means, an energizing circuit for said solenoid, a relay for closing said energizing circuit, an energizing circuit for said relay, a contact device associated with each of said gages and arranged to be closed in response to pressure of the work against the gage, said devices being arranged in series to control said relay circuit, and a contact device in parallel with said series devices for maintaining said relay circuit closed.

31. In a machine for operating upon work, the combination with a tool for operating upon a work piece, and power-driven means for operating said tool, of a plurality of gages for determining the position of the work piece relatively to said tool, a member movable toward the work to hold it in the position determined by said gages for the operation of said operating tool, spring means for holding said member in an inoperative position and against the resistance of which the holding member is movable toward the work, a solenoid for moving said holding member toward the work, an energizing circuit for said solenoid, a contact device associated with each of said gages and arranged to be closed in response to pressure of the work against the gage, said devices being arranged in series to control said energizing circuit, and a mechanically operated switch for also controlling said energizing circuit to cause deenergization of said solenoid to release the holding member to the action of said spring means in predetermined time relation to the operation of said tool.

32. In a machine for operating upon work, the combination with a tool for operating upon a work piece, and power-driven means for operating said tool, of a plurality of gages for determining the position of the work piece relatively to said tool, a member movable toward the work to hold it in the position determined by said gages for the operation of said operating tool, spring means for holding said member in an inoperative position and against the resistance of which the holding member is movable toward the work, a solenoid for moving said holding member toward the work, an energizing circuit for said solenoid, a contact device associated with each of said gages and arranged to be closed in response to pressure of the work against the gage, said devices being arranged in series to control said energizing circuit, a switch in said energizing circuit arranged to be held normally closed, and automatic means for opening said switch to cause deenergization of said solenoid to release said holding member to the action of said spring means after said tool has completed its operation upon the work piece.

33. In an insole punching machine, a punching tool, gaging means comprising a plurality of gages movable in response to pressure of an insole against them when presented by the operator to determine the position of the insole relatively to said punching tool, and means controlled by all of said gages for operating said punching tool only when the work has been moved into the position determined by said gages.

34. In an insole punching machine, the combination with a punching tool, power-driven means for operating said punching tool, and mechanism for starting said power-driven means in operation, of gaging means comprising a plurality of gages movable in response to pressure of an insole against them when presented by the operator to determine the position of the insole relatively to said punching tool, and means dependent upon the movement of all of said gages to position the insole for operating said starting mechanism.

35. In an insole punching machine, a punching tool, gaging devices for determining the position of an insole relatively to said punching tool, said devices each comprising a gaging member movable in response to pressure of the insole against it while other parts of said device are stationary, and means controlled by such movement of all of said gaging members for operating said punching tool.

36. In an insole punching machine, the combination with a punching tool, power-driven means for operating said punching tool, and mechanism for starting said power-driven means in operation, of a plurality of gaging devices for determining the position of an insole relatively to said punching tool, said devices each comprising an insole-engaging member mounted for limited movement relatively to other parts of said device in response to pressure of the insole against it, and means controlled by such movement of all of said insole-engaging members for operating said starting mechanism.

37. In a machine for operating upon work, the combination with a tool for operating upon a work piece, and power-driven means for operating said tool, of gaging means for determining the position of the work piece relatively to said tool, a member movable toward the work to hold it in the position determined by said gaging means for the operation of said operating tool, spring means for holding said member in an inoperative position and against the resistance of which the holding member is movable toward the work, an electro-magnetic means for moving said holding member toward the work, an energizing circuit for said electro-magnetic means, and means controlled by said gaging means for closing said energizing circuit.

38. In an insole punching machine, the combination with a punching tool, power-driven means for operating said tool, and mechanism for starting said power-driven means in operation, of a plurality of gages for locating an insole in predetermined relation to said punching tool, electro-magnetic means for operating said starting mechanism, an energizing circuit for said electro-magnetic means, and a switch associated with each of said gages and arranged to be closed in response to pressure of the insole against the gage, said switches being arranged in series to control said energizing circuit.

39. In an insole punching machine, the combination with a power-driven punching tool, and mechanism for starting said power-driven tool in operation, of gaging means for locating an insole in predetermined relation to said punching tool comprising a toe gage and opposite side gages, an electrical device for operating said starting mechanism, and a plurality of switches connected in series to control said electrical device and associated one with each of said gages, said opposite side gages and their associated switches being mounted for relative movement to close the switches in response to pressure of the insole against the gages and being connected to move thereafter in unison in response to the introduction of the insole.

40. In an insole punching machine, the combination with a power-driven punching tool, and mechanism for starting said power-driven tool in operation, of an electrical device for operating said starting mechanism, gaging devices for locating an insole in predetermined relation to said punching tool comprising a toe device and two pairs of side devices, each of said toe and side devices comprising an insole-engaging member and an arm mounted for limited relative swinging movement about a common axis in response to pressure of the insole against said member, a switch carried by each of said arms and arranged to be closed in response to such relative swinging movement, said switches being connected in series to control said electrical device, and adjustable members movable independently of each other and associated one with each of said pairs of side devices for swinging the insole-engaging member and the arms of each pair together about their common axes to vary the positions of the side devices to accommodate insoles of different sizes.

41. In an insole punching machine, the combination with a power-driven punching tool, and mechanism for starting said power-driven tool in operation, of an electrical device for operating said starting mechanism, gaging devices for locating an insole in predetermined relation to said punching tool comprising a toe device and two pairs of side devices, each of said toe and side devices comprising an insole-engaging member and an arm mounted for limited relative swinging movement about a common axis in response to pressure of the insole against said member, a switch carried by each of said arms and arranged to be closed in response to such relative swinging movement, said switches being connected in series to control said electrical device, the arms of each pair of side devices being connected together to cause the insole-engaging members and the arms of each pair to move in unison in response to the introduction of the insole after the closing of the switches carried by the arms, and means for swinging the insole-engaging member and the arm of said toe device together about their common axis to vary the position of the toe device to accommodate insoles of different styles.

42. In an insole punching machine, a power-driven tool for punching in an insole positioning holes in predetermined relation to its edge contour, a clutch through which said power-driven tool is operated, a solenoid for actuating said clutch, an energizing circuit for said solenoid, a plurality of gaging devices for positioning an insole in predetermined relation to said punching tool, said devices each comprising an insole-engaging member and an arm relatively to which said insole-engaging member is mounted for limited movement in response to pressure of the insole against it, and a switch carried by each of said arms and arranged to be closed in response to movement of the insole-engaging member relatively to the arm, said switches being arranged in series to control said energizing circuit.

43. In an insole punching machine, a punching tool, power-driven means for operating said tool, mechanism for starting said power-driven means in operation, a solenoid for operating said starting mechanism, an energizing circuit for said solenoid, a plurality of switches in said circuit, and a plurality of gaging devices for determining the position of an insole relatively to said punching tool and for operating said switches, said gaging devices each comprising a support for one of said switches and a member for engaging the insole movable relatively to the support to close its associated switch in response to pressure of the insole against it, said switches being arranged in series to control the energizing circuit.

44. In an insole punching machine, a punching tool, power-driven means for operating said tool, mechanism for starting said power-driven means in operation, a plurality of gages for determining the position of an insole relatively to said punching tool, means for holding said insole in the position determined by said gages for the operation of said punching tool, a solenoid for operating said starting mechanism, a solenoid for operating said holding means, an energizing circuit for each of said solenoids, and a switch associated with each of said gages and arranged to be closed in response to pressure of the insole against the gage, said switches being arranged in series to control both said energizing circuits.

45. In an insole punching machine, a punching tool, power-driven means for operating said punching tool, mechanism for starting said power-driven means in operation, a plurality of gages for determining the position of an insole relatively to said punching tool, means for holding said insole in the position determined by said gages for the operation of said punching tool, a solenoid for operating said starting mechanism, a solenoid for operating said holding means, an energizing circuit for each of said solenoids, a switch associated with each of said gages and arranged to be closed in response to pressure of the insole against the gage, said switches being arranged in series to control both said energizing circuits, and a mechanically operated switch for opening one of said energizing circuits to cause deenergization of one of said solenoids at a predetermined time in the operation of the machine.

46. In an insole punching machine, a tool for punching in an insole positioning holes in predetermined relation to its edge contour, an anvil for said tool, a member arranged to receive and support an insole on the opposite side from said anvil in predetermined angular relation to said punching tool, said member and the anvil being relatively adjustable to accommodate insoles of different thicknesses, and a plurality of gages arranged by engagement with the edge face of an insole at an end and at the opposite sides of the end portion of the insole to position it upon said supporting member in predetermined relation to said punching tool, the side gages being yieldingly mounted and connected to move in unison when separated by the introduction of an insole, and said end gage being adjustable to accommodate insoles of different styles.

47. In an insole punching machine, the combination with a vertically movable plunger, and three spaced punches carried by said plunger, of a member arranged to receive and support an insole in predetermined angular relation to said punches, a second member arranged to engage the opposite face of an insole on said supporting member and to serve as an anvil for the punches in the punching operation, said members being relatively adjustable to accommodate insoles of different thicknesses and one of them being provided with openings for the punches, gaging devices arranged to engage the edge face of an insole on said supporting member and to position it in predetermined relation to said punches comprising a toe gage and two pairs of side gages for engaging the insole at the opposite sides of the toe end and at different distances from said toe gage, the side gages of each pair being yieldingly mounted and connected to move in unison when separated by the introduction of an insole, and means for adjusting the toe gage relatively to said side gages in directions lengthwise of the insole to accommodate insoles of different styles.

48. In an insole punching machine, a tool for punching in an insole positioning holes in predetermined relation to its edge contour, an anvil for said tool, a member arranged to receive and support an insole in predetermined angular relation to said tool and anvil, said member being movable toward and from said anvil to accommodate insoles of different thicknesses and being provided with openings to receive said punching tool, gaging means arranged to engage the edge face of an insole on said supporting member at its toe end and at the opposite sides of its toe end to position the insole in predetermined relation to said punching tool, and means for holding said insole in the position determined by said gages for the operation of said punching tool.

49. In an insole punching machine, a tool for punching in an insole positioning holes in predetermined relation to its edge contour, means for supporting the insole for the punching operation, a plurality of gages for locating each insole on said supporting means in predetermined relation to said punching tool, and means movable relatively to said supporting means and constructed to pierce part way through said insole and to hold it in the position determined by said gages for the operation of said punching tool.

50. In an insole punching machine, a tool for punching in an insole positioning holes in predetermined relation to its edge contour, an anvil for said tool, a sole support adjustable relatively to said anvil to accommodate insoles of different thicknesses, said support being arranged to receive and support an insole in predetermined angular relation to said tool and anvil, a plurality of gages for locating each insole on said support in predetermined relation to said punching tool, and means movable relatively to said support and anvil and constructed to pierce part way through said insole and to hold it in the position determined by said gages for the operation of said punching tool.

51. In an insole punching machine, a tool for punching in an insole positioning holes in predetermined relation to its edge contour, an anvil for said tool, a sole support located between said tool and the anvil and arranged to receive and support an insole in predetermined angular relation to said tool, said support being adjustable relatively to said anvil to accommodate insoles of different thicknesses, a plurality of gages for locating each insole on said support in predetermined position relatively to said punching tool, and means for holding each insole on said support in the position determined by said gages for the operation of said punching tool and for releasing the insole substantially at the end of the punching operation.

52. In an insole punching machine, the combination with a plurality of punching tools for forming in an insole positioning holes in predetermined relation to its edge contour, and means for supporting an insole in predetermined angular relation to said tools, of a plurality of gages for locating an insole on said supporting means in predetermined relation to said punching tools, a pair of members movable relatively to said supporting means and constructed to pierce part way through said insole and to hold it in the position determined by said gages for the operation of said punching tools, a spring against the resistance of which said holding members are thus movable, and means for imparting to said members a movement relatively to said supporting means into position partially to pierce the insole substantially at the beginning of the operation of the machine and for releasing them to the action of said spring at the end of the punching operation.

53. In an insole punching machine, the combination with a power-driven punching tool, and mechanism for starting said power-driven tool in operation, of an electrical device for operating said starting mechanism, gaging devices for locating an insole in predetermined relation to said punching tool comprising a toe device, and two pairs of side devices, each of said toe and side devices comprising an insole-engaging member and an arm relatively to which the insole-engaging member is mounted for limited movement in response to pressure of the insole against it, a switch carried by each of said arms and arranged to be closed in response to movement of the insole-engaging member relatively to the arm, said switches being arranged in series to control said electrical device, and the arms of each pair of side devices being connected together to cause the insole-engaging members and the switches of each pair to move in unison in response to further movement of the insole.

54. In an insole punching machine, the combination with a power-driven punching tool, and mechanism for starting said power-driven tool in operation, of gaging means for locating an insole in predetermined relation to said punching tool comprising a toe gage and two pairs of side gages, an electrical device for operating said starting mechanism, a switch associated with each of said toe and side gages and relatively to which its associated gage is mounted for limited movement to close the switch in response to pressure of the insole against the gage, said switches being connected in series to control said electrical device, and means for adjusting the side gages of each pair toward or from each other and with them their associated switches to vary the positions of the side gages to accommodate insoles of different sizes.

55. In an insole punching machine, the combination with a power-driven punching tool, and mechanism for starting said power-driven tool in operation, of gaging means for locating an insole in predetermined relation to said punching tool comprising a toe gage and two pairs of side gages, an electrical device for operating said starting mechanism, a switch associated with each of said toe and side gages and relatively to which its associated gage is mounted for limited movement to close the switch in response to pressure of the insole against the gage, said switches being connected in series to control said electrical device, means for adjusting the side gages of each pair toward or from each other and with them their associated switches to vary the positions of the side gages to accommodate insoles of different sizes, and means for adjusting the toe gage and its associated switch relatively to said side gages to accommodate insoles of different styles.

AUGUST R. SCHOENKY.